United States Patent [19]

Murata

[11] Patent Number: 5,673,119
[45] Date of Patent: Sep. 30, 1997

[54] ENCODING PROCESSING APPARATUS

[75] Inventor: Yukio Murata, Yokohama, Japan

[73] Assignee: Canon Kabushiki Kaisha, Tokyo, Japan

[21] Appl. No.: 509,583

[22] Filed: Jul. 31, 1995

[30] Foreign Application Priority Data

Aug. 3, 1994 [JP] Japan ................................ 6-182134

[51] Int. Cl.$^6$ .......................... H04N 1/40; H04N 1/419; H04N 1/415; H04N 1/32
[52] U.S. Cl. .............. 358/448; 358/261.1; 358/261.3; 358/468; 358/442; 382/234; 382/235; 382/245; 382/304
[58] Field of Search ...................... 358/448, 261.1, 358/261.3, 427, 408, 468, 442, 404, 440; 382/234, 235, 245, 304

[56] References Cited

U.S. PATENT DOCUMENTS

| | | | |
|---|---|---|---|
| 4,799,110 | 1/1989 | Hisada et al. | 358/261.3 |
| 4,887,164 | 12/1989 | Takahashi | 358/443 |
| 4,916,607 | 4/1990 | Teraichi et al. | 364/200 |
| 5,170,263 | 12/1992 | Hisatake et al. | 358/448 |
| 5,216,522 | 6/1993 | Ishikawa | 358/448 |
| 5,566,254 | 10/1996 | Murata et al. | 382/304 |

*Primary Examiner*—Kim Vu
*Assistant Examiner*—Tia M. Harris
*Attorney, Agent, or Firm*—Fitzpatrick, Cella, Harper & Scinto

[57] ABSTRACT

Image data, read by an image reading device and binarized, is stored in a buffer memory by one scanning line. Then a compressive coding on the stored image data by one scanning line and a compressive coding on image data developed form codes, such as codes written in a page description language (PDL), or image data read from a predetermined memory are performed by a single encoder.

20 Claims, 10 Drawing Sheets

ENCODING PROCESSING APPARATUS

BACKGROUND OF THE INVENTION

The present invention relates to an encoding processing apparatus and, more particularly, to an encoding processing apparatus which performs a compressive coding on image data read by an image reading device.

G3 facsimile devices have become common in firms at a high proliferation rate, and have established their positions as a necessary OA device. And now, extended functions of a G3 facsimile device have been developed and its price decreased. As a result, different types of G3 facsimile devices, from those having simple functions to those having many extended functions, have been developed and are available. Further, communication speed is greatly increased, and a G3 facsimile device whose communication speed is over 20 kbps has been developed.

Further, communication service has begun using ISDN which is a digital communication network, using digital techniques instead of the conventional analog telephone line. Accordingly, G4 facsimile device capable of directly connecting to the ISDN has gradually become popular. The advanced features of a G4 facsimile device are a resolution of 400 dpi, and a high communication speed of 64 kbps.

A user also demands an increase in speed of reading an original, and there has been developed a device capable of reading 30 pages of originals (A4 size, the resolution in the sub-scanning direction is 3.85 mm/line) in one minute. Thus, by combining the aforesaid features of high speed reading and high speed communication, a facsimile device capable of sending documents at very high speed is realized.

Further, among facsimile devices which have been developed, there is a facsimile device having high technological functions, such as multi-access and dual access, which are not adopted by conventional facsimile devices. Therefore, it is possible to provide improved operability to a user. The multi-access functions are, in a facsimile device which connects to the ISDN line or the like, are "to send during receiving documents", "to receive during sending documents", and so on. Further, the dual access functions are "to accept sending reservations during sending or receiving documents", "to accept copying or sending reservations during sending data from a memory", and so on.

However, a facsimile device, having the above-mentioned functions and further performing high speed reading and high speed communication, is required not only to perform a compressive coding on a plurality of pages in parallel but also to perform the coding at high speed, thus causing complication of the mechanical construction and the control system of the facsimile device, thereby causing manufacturing cost to increase.

In addition, recently used recording paper by a facsimile device tends to be ordinary paper. Accordingly, many kinds of facsimile devices, such as a laser facsimile device having a laser printer and a facsimile device having an ink-jet printer, have been developed. In the above case, functions to print and send a file which is stored in a personal computer by using the facsimile devices are demanded.

Document created by a personal computer may be generated by using a page description language. In order to perform a compressive coding on image data converted to bitmap data by a page description language processing apparatus, and to send the encoded image data via a facsimile device, further complicates the mechanical construction and the control system of the facsimile device, thereby increasing manufacturing cost.

SUMMARY OF THE INVENTION

The present invention has been made in consideration of the above situation, and has as its object to provide an encoding processing apparatus having multi-access and dual access functions and capable of performing coding process corresponding to high speed reading and high speed communication by using a simple configuration and a simple control system, especially by using a buffer memory of small capacity.

Further, another object of the present invention is to provide an encoding processing apparatus also capable of performing a compressive coding on the image data converted from a page description language to bitmap data by using a simple configuration.

According to the present invention, the foregoing objects are obtained by providing an encoding processing apparatus which performs a compressive coding on image data read by an image reading device, comprising: first image processing means for binarizing the image data read by the image reading device; memory means for storing the binarized image data by one scanning line; second image processing means for reading image data stored in a predetermined memory and for outputting the read data as serial image data; first output means for selectively outputting either the image data outputted from the memory means or the image data outputted from the second image processing means; and encoding means for performing an encoding process on the image data which is selectively outputted from the first output means.

In accordance with the present invention as described above, the encoding processing apparatus preferably further comprises: means for storing the image data from the second image processing means in the memory means by one scanning line; and means for selectively reading the image data which is outputted from the second image processing means and stored in the memory means, and the binarized image data by one scanning line, wherein the encoding means performs suitable coding process corresponding to the image data which is selectively read.

With the configuration as described above, the apparatus having a simple configuration performs a compressive coding on read image data which is to be encoded in real time.

Further, the encoding processing apparatus preferably further comprises: page description language processing means for converting a page description language into image data; and second output means for selectively outputting either the binarized image data or the image data converted by the page description language processing means, wherein the first output means selectively outputs either the image data outputted form the second output means or the image data outputted from the second image processing means, and wherein the encoding means performs suitable coding process on the outputted image data.

With the aforesaid configuration, the apparatus having a simple configuration performs a compressive coding on image data which is converted from a page description language to bitmap data.

Other features and advantages of the present invention are apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
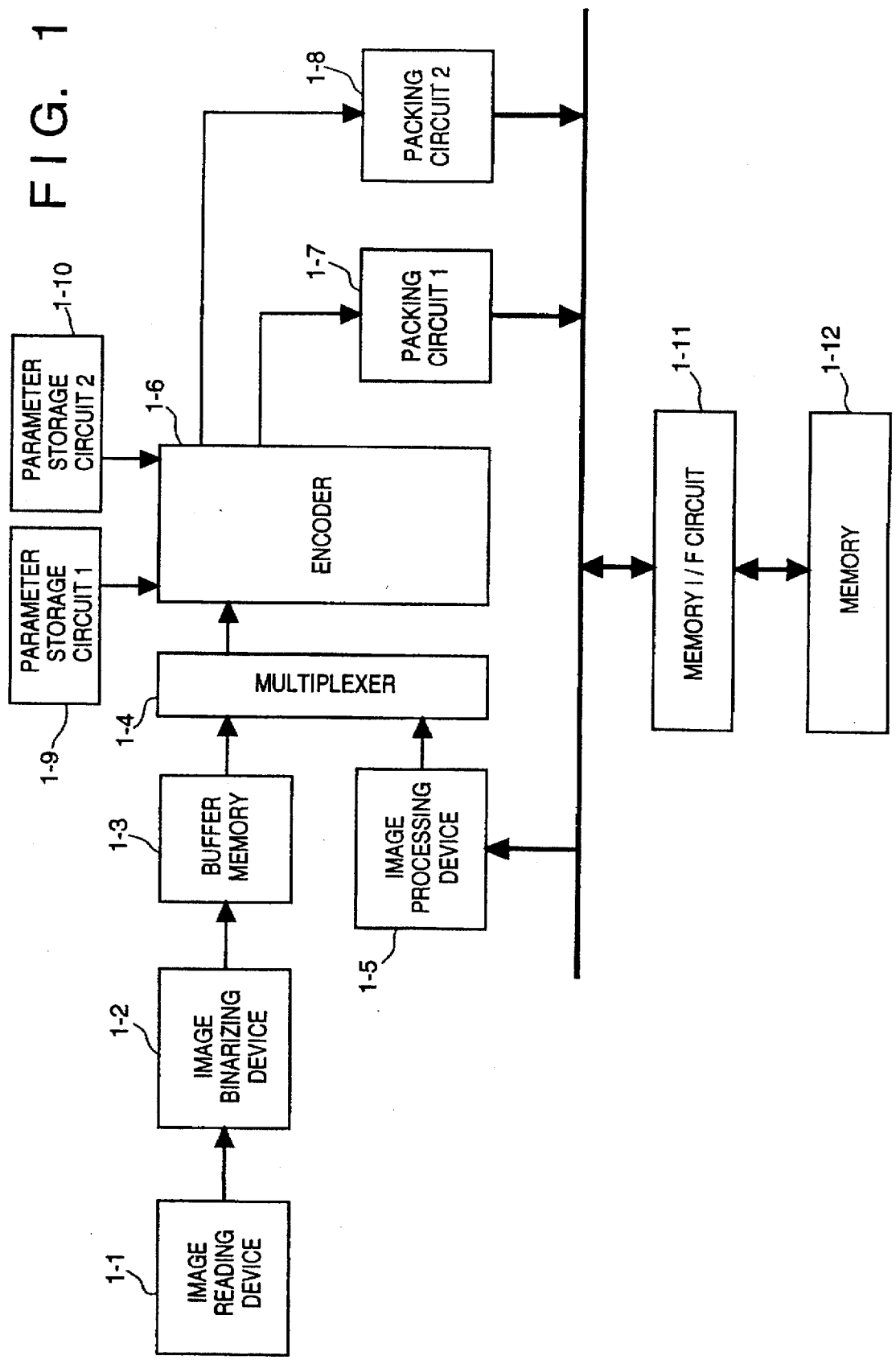
FIG. 1 is a block diagram showing a configuration of an encoding processing apparatus according to a first embodiment of the present invention.

FIG. 1 is a block diagram showing a configuration of an encoding processing apparatus according to a first embodiment of the present invention. In FIG. 1, reference numeral 1—1 denotes an image reading device composed of a contact sensor (not shown) which consists of an optical device and the like, for instance, and it performs photoelectric conversion on the optically read data and outputs the data. Reference numeral 1-2 denotes an image binarizing device composed of an A/D converter, an image processing circuit and the like, and it performs image processes, such as A/D conversion, image correction, and binarization, on the photoelectric-converted data, and outputs the binarized data.

Reference numeral 1-3 denotes a buffer memory composed of FIFO, semiconductor memory, such as a SRAM, and the like, for instance, and it stores the input binarized image data by one scanning line and outputs the image data by one scanning line. This buffer memory 1-3 is further described later. Reference numeral 1-4 denotes a multiplexer composed of AND gates, OR gates and the like, for instance, and it selects image data either from the buffer memory 1-3 or from an image processing device 1-5 which functions as a P/S (parallel/serial) converter, and outputs the selected data.

The image processing device 1-5 functions as the P/S converter which reads image data from a memory in the embodiments. It should be noted that the image processing device can be a decoding device, and an image enlarging or compressing device.

The image processing device 1-5 functioning as the P/S converter consists of flip-flops and the like, for example, and it reads out image data stored in a memory 1-12 via a memory I/F circuit 1-11, and converts the image data which is parallel data composed of multi-bits into serial data, and outputs the data.

Reference numeral 1-6 denotes an encoder, which encodes image data inputted via the multiplexer 1-4 into compressed codes. The encoder 1-6 corresponds to a virtual changing point detecting circuit which detects virtual changing points on reference lines, and a portion which is from a coding line changing point detecting circuit to a packing circuit in an encoding apparatus disclosed in U.S. Pat. No. 4,799,110, for example.

Compressed codes generated by the aforesaid encoder 1-6 do not have fixed code lengths if they are MMR, MR, or MH codes, suggested by the ITU (previous CCITT), for instance. More specifically, some codes have a code length of 1 bit, and other codes may have a code length of 16 bits. Therefore, the compressive encoded data is sent to packing circuits 1 and 2 (denoted by reference numerals 1-7 and 1-8) where the code data is packed so that the code length become a unit number obtained by multiplying a byte by integers, and is stored in the memory 1-12 through the memory I/F circuit 1-11.

Reference numerals 1-9 and 1-10 denote parameter storage circuits, and they store parameters which are necessary for the encoder 1-6. The parameters indicate the number of bits in a single line to be encoded, a coding method and the like, as the parameters. The aforesaid packing circuits 1-7 and 1-8, the parameter storage circuits 1-9 and 1-10, and the multiplexer 1-4 are controlled so as to be coupled to each other, and the packing circuits 1-7 and 1-8 as well as the parameter storage circuits 1-9 and 1-10 are used alternately by one scanning line.

The memory I/F circuit 1-11 is composed of a DMA controller, timing controller and the like, for instance, and it writes data sent from various kinds of connected circuits into the memory 1-12 in accordance with a memory access request sent from the various kinds of circuits, and reads data from the memory 1-12 and sends the data to the various kinds of devices. The memory 1-12 is a memory circuit composed of a dynamic RAM and the like, for example, and stores data in accordance with control by a memory controller (not shown).

Next, a brief operation of the buffer memory 1-3 according to the first embodiment is explained.

Figure 2:
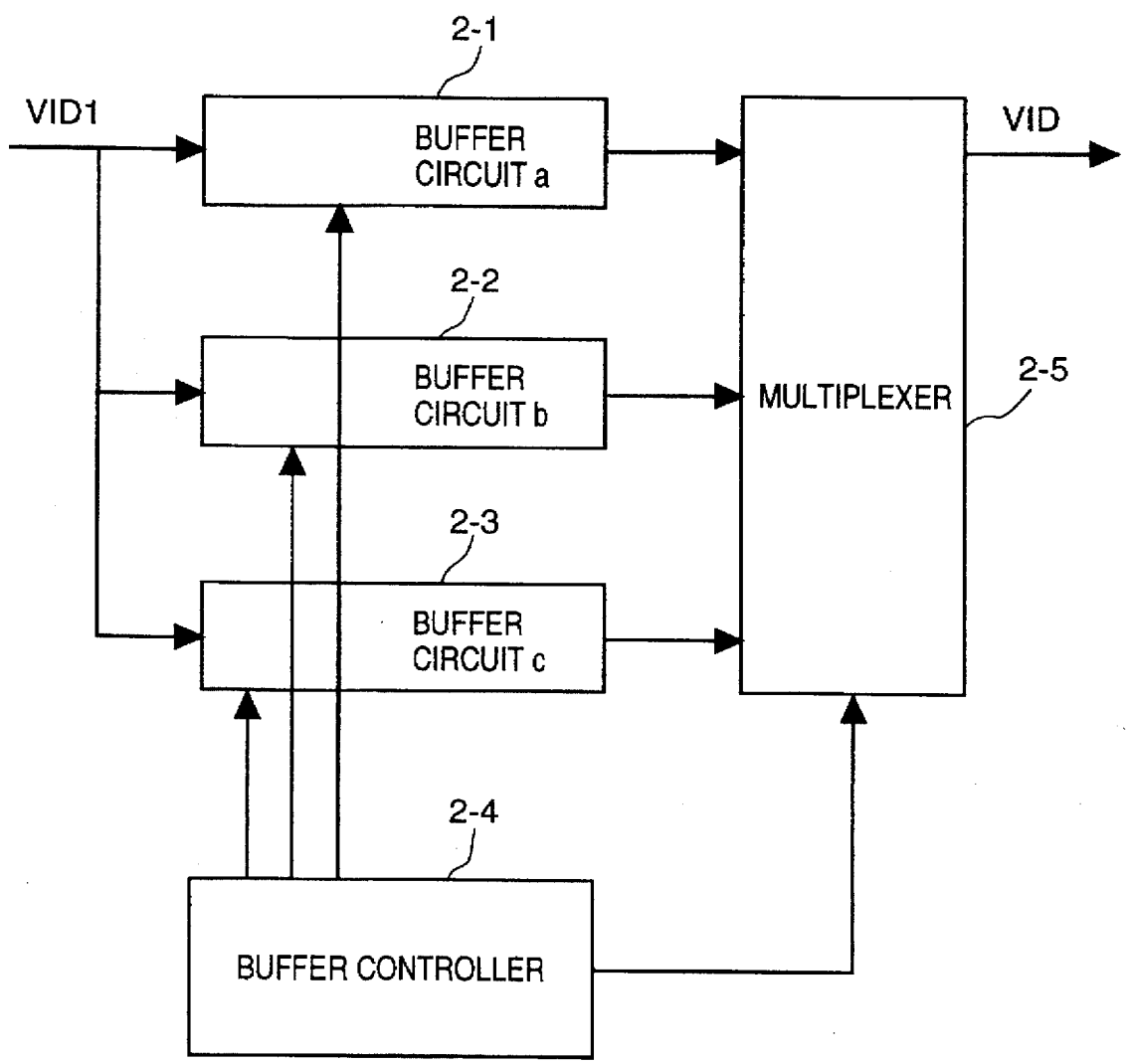
FIG. 2 is a block diagram showing a detailed configuration of the buffer memory 1-3 of FIG. 1.

FIG. 2 is a block diagram showing a detailed configuration of the buffer memory 1-3. In FIG. 2, reference numerals 2—1, 2—2, and 2—3 respectively denote buffer circuits a, b, and c each of which, for example consists of SRAM, FIFO and the like. Binarized image data is stored in these buffers a, b, and c in turn by one scanning line.

Further, reference numeral 2-4 denotes a buffer controller, which performs address control and image input/output control of the buffers a, b, and c. Reference numeral 2-5 denotes a multiplexer which selects on of the outputs from the buffers a, b, and c for output.

Figure 3:
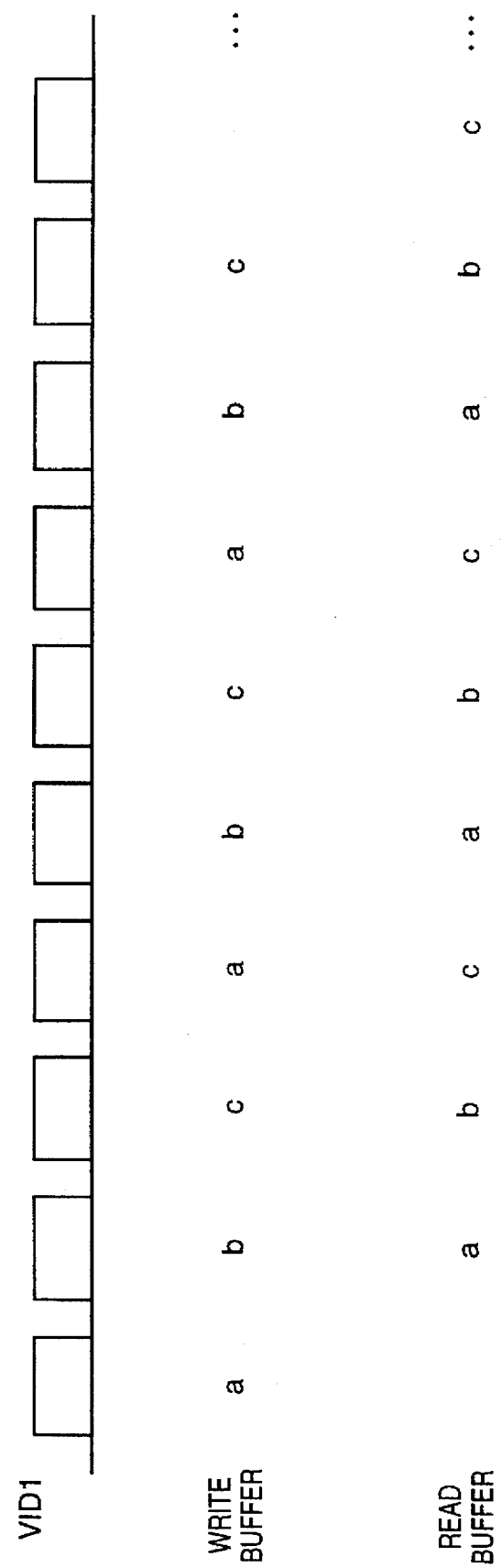
FIG. 3 is a diagram of data storing and data reading orders to and from buffer circuits by one scanning line.

FIG. 3 is a diagram of data storing and data reading orders to and from buffer circuits by one scanning line. More particularly, data of the first line is stored in the buffer circuit a, data of the second line is stored in the buffer circuit b, and data of the third line is stored in the buffer circuit c, as a write operation. This operation is subsequently repeated, thus data is written.

Further, as a read operation from the buffer memory 1-3, while the data in the second line is written in the buffer circuit b, the data is read from the buffer circuit a, and while the data in the third line is written in the buffer circuit c, the data is read from the buffer circuit b. Likewise, while data in the fourth line is written in the buffer circuit a, the data is read from the buffer circuit c. The likewise operation is repeated subsequently, thereby data is read from the buffer memory 1-3.

Figure 4:
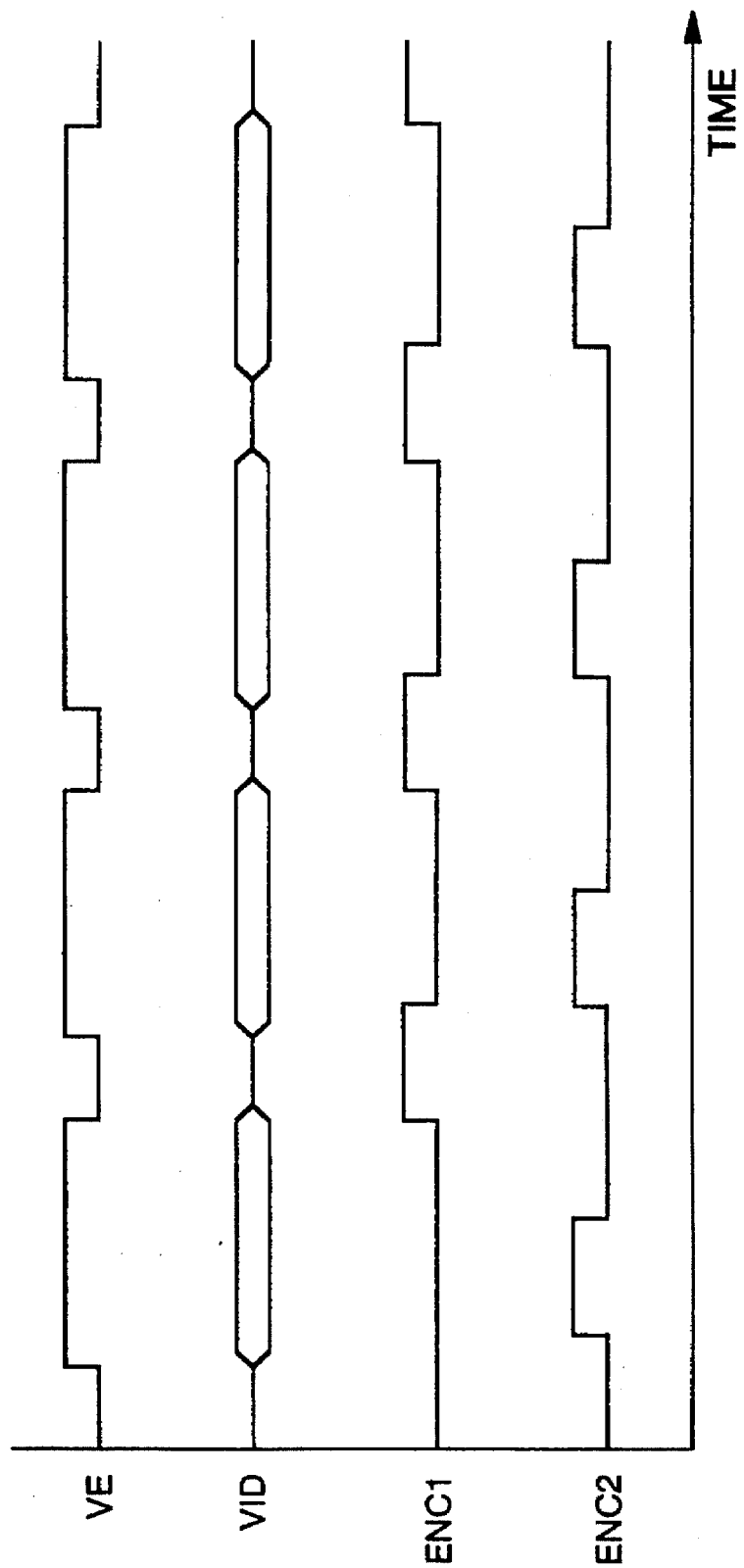
FIG. 4 is a timing chart of encoding timing of image data in the encoding circuit 1-6 of FIG. 1.

Next, referring to a timing chart shown in FIG. 4, a process in which input data is performed with a compressive coding in the encoder 1-6 is described.

FIG. 4 shows encoding timing to perform two coding processes in turn by one scanning line on the basis of image data "VID" and an image synchronizing signal "VE" outputted from the image binarizing device 1-2 shown in FIG. 1. Here, the image data is valid when the signal VE is at a logical HIGH level.

At the timing when the image synchronizing signal VE becomes low, the image data VID outputted from the image binarizing device 1-2 starts a compressive coding. During the performing the compressive coding, an ENC 1 signal is at a logical HIGH level. At this time, an output from the buffer memory 1-3 is selected as an output of the multiplexer 1-4, an output from the parameter storage circuit 1 (1-9) is selected from outputs from the parameter storage circuits, and an output from the packing circuit 1 (1-7) is selected from outputs from the packing circuits. These selected outputs are used in the above compressive coding.

Further, when an ENC 2 signal is at a logical HIGH level, outputs from the image processing device 1-5, the P/S converter, are performed with a compressive coding. In this case, an output from the image processing device 1-5 is selected as an output of the multiplexer 1-4, an output from the parameter storage circuit 2 (1-10) is selected from outputs from the parameter storage circuits, and an output from the packing circuit 2 (1-8) is selected from outputs from the packing circuits, then the selected outputs are used. It should be noted that, in the encoder 1-6 shown in FIG. 1, the compressive coding process is performed at a speed which is at least twice as fast as the speed of inputting an image data, thus encoding of input image data is completed in less than half the period of image synchronizing signal VE. This process is realized by setting an operational frequency of a compressive encoding apparatus, disclosed in U.S. Pat. No. 4,799,110, to more than double the image inputting frequency.

Next, generation of the above ENC 1 and ENC 2 signals is described.

Figure 5:
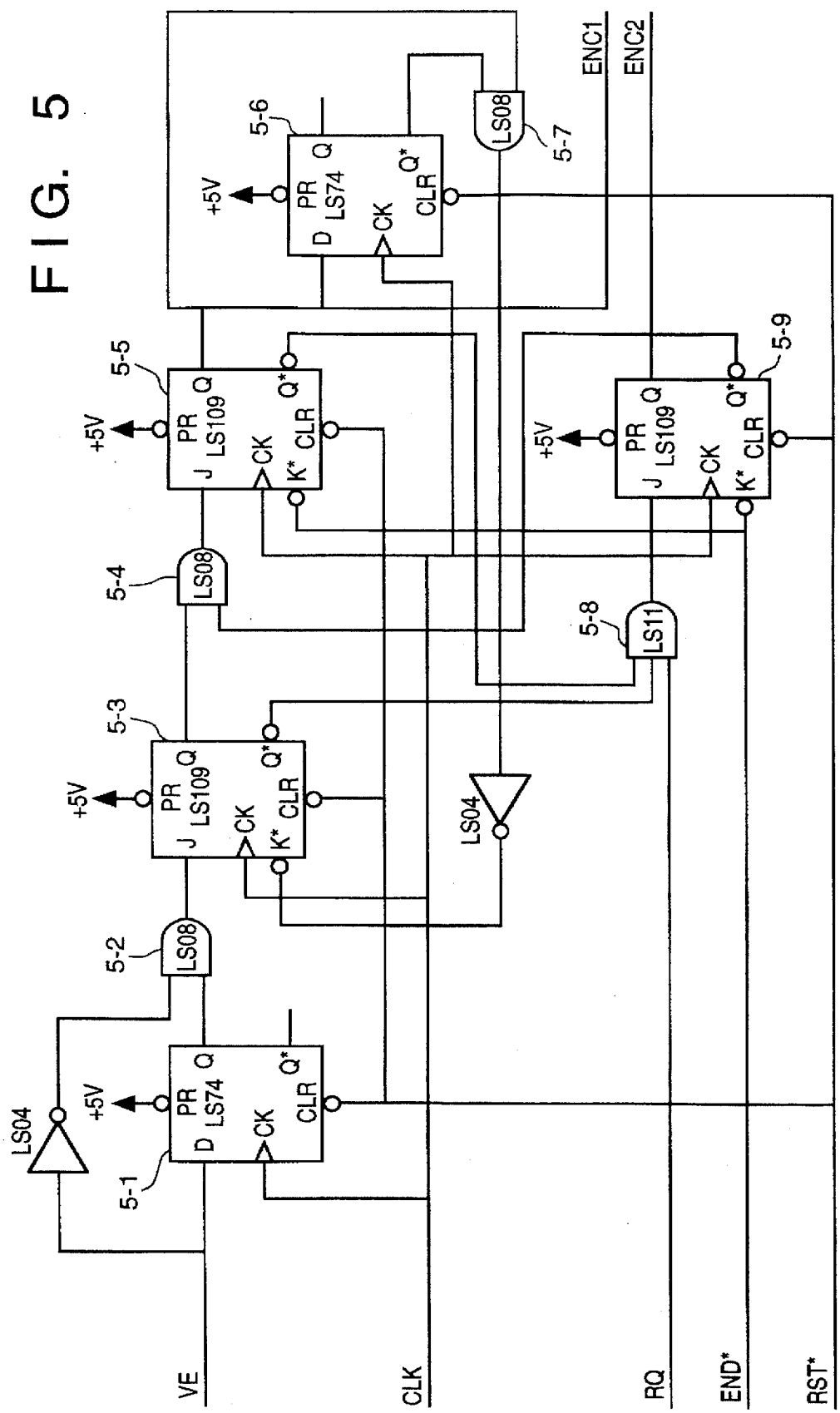
FIG. 5 is a block diagram illustrating an example of an encoding process selector.

FIG. 5 is a block diagram illustrating an example of an encoding process selector included in the multiplexer 1-4 or the encoder 1-6. Further, FIG. 6 is a timing chart of the operational timing in the encoding process selector.

Figure 6:
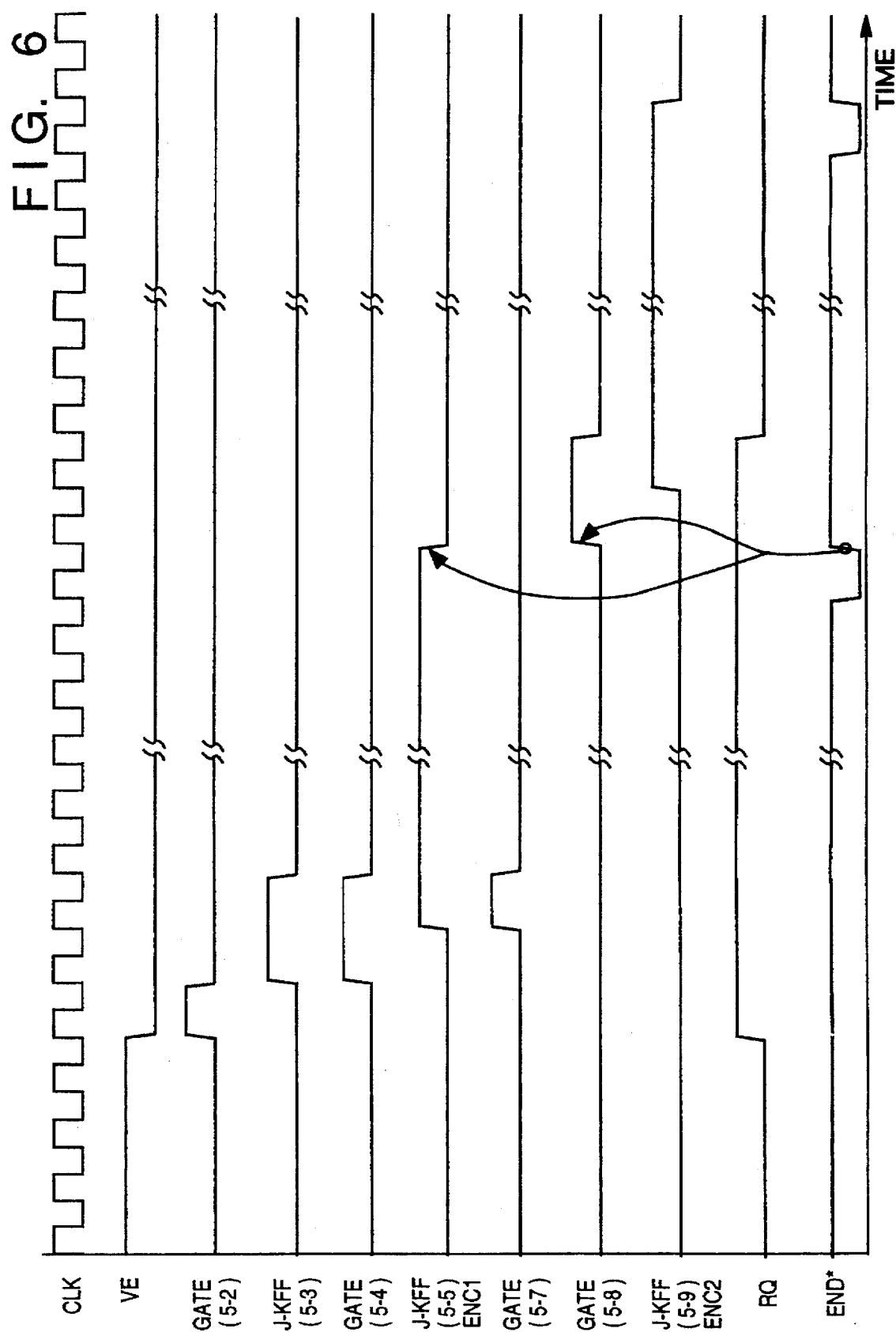
FIG. 6 is a timing chart of operational timing in the encoding process selector of FIG. 5.

The falling edge of the VE signal shown in FIG. 6, is detected by a D flip-flop 5-1 and an AND gate 5-2 shown in FIG. 5, and a J terminal of a JK flip-flop 5-3 becomes ON (logical HIGH). This signal is a request signal for requesting a compressive coding on image data to be stored in the buffer memory 1-3.

An RQ signal is a compressive coding request signal for requesting the compressive coding on outputs from the image processing device 1-5. The timing chart in FIG. 6 shows a situation when both of these two signals are ON.

In this case, image data to be stored in the buffer memory 1-3 has priority to be processed with the compressive coding in correspondence with the compressive coding request signal. Further, a signal from a gate 5-4 becomes ON, and the signal is inputted into a J terminal of a JK flip-flop 5—5. Accordingly, the output from the JK flip-flop 5—5, namely the ENC 1 signal becomes ON.

When the ENC 1 signal becomes ON, a rising edge of the ENC 1 signal is detected by a D flip-flop 5-6 and an AND gate 5-7. In accordance with the edge detection, an output of the JK flip-flop 5-3 becomes OFF, namely, the request signal for requesting a compressive coding on the image data stored in the buffer memory 1-3 becomes OFF.

When the above process during the time ENC 1 is ON is completed, the encoder 1-6 outputs an END* signal which indicates completion of encoding on a single line, namely the ENC 1 signal becomes OFF. Thereby, as shown in the timing chart in FIG. 6, an output of a gate 5-8 becomes ON, which makes a JK flop-flop 5-9 ON, namely the ENC 2 signal becomes ON.

Similarly, when a single line of the image data to be stored in the image processing device 1-5 has been processed with the compressive coding, the END* signal is outputted from the encoder 1-6, accordingly, the ENC 2 becomes OFF.

In the subsequent processes, the above processes during the time ENC 1 is ON and during the time ENC 2 is ON are performed alternately in the aforesaid manner.

As described above, according to the first embodiment, by selectively performing a compressive coding on either binarized image data stored in a buffer memory by one scanning line or data obtained by performing parallel/serial conversion on image data stored in a memory in time division, it is possible to encode read image data which is required to be encoded in real time with a simple configuration.

Second Embodiment

A second embodiment of the present invention is described below.

Figure 7:
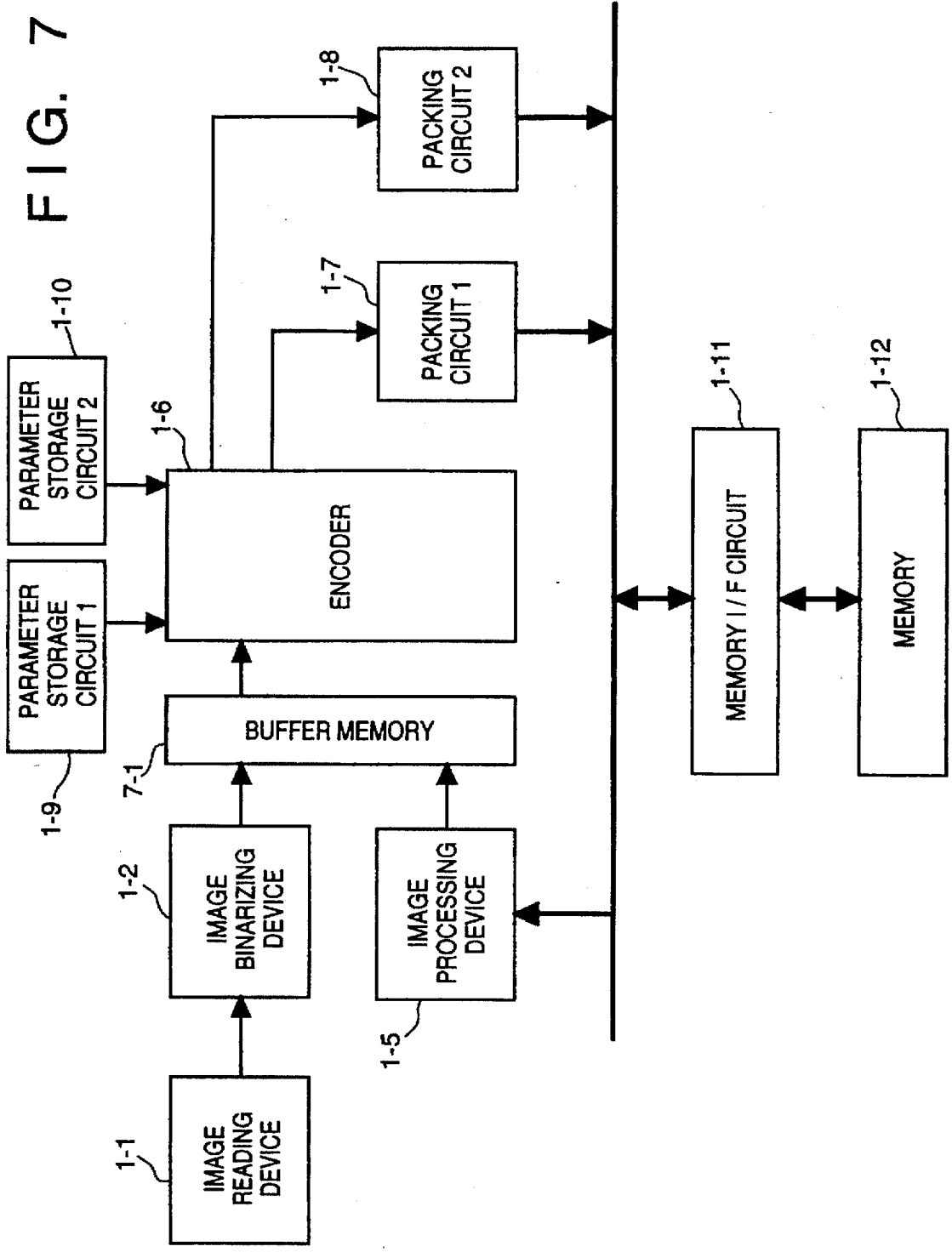
FIG. 7 is a block diagram showing a configuration of an encoding processing apparatus according to a second embodiment.

FIG. 7 is a block diagram showing a configuration of an encoding processing apparatus according to a second embodiment. It should be noted that the same units and elements as those in the first embodiment shown in FIG. 1 are referred to by the same reference numerals in the second embodiment, and explanations those are omitted.

As shown in FIG. 7, the difference between the configuration in the first embodiment and the configuration in the second embodiment is that the buffer memory 7-1 stores not only image data from the image binarizing device 1-2 but also image data outputted from the image processing device 1-5.

Figure 8:
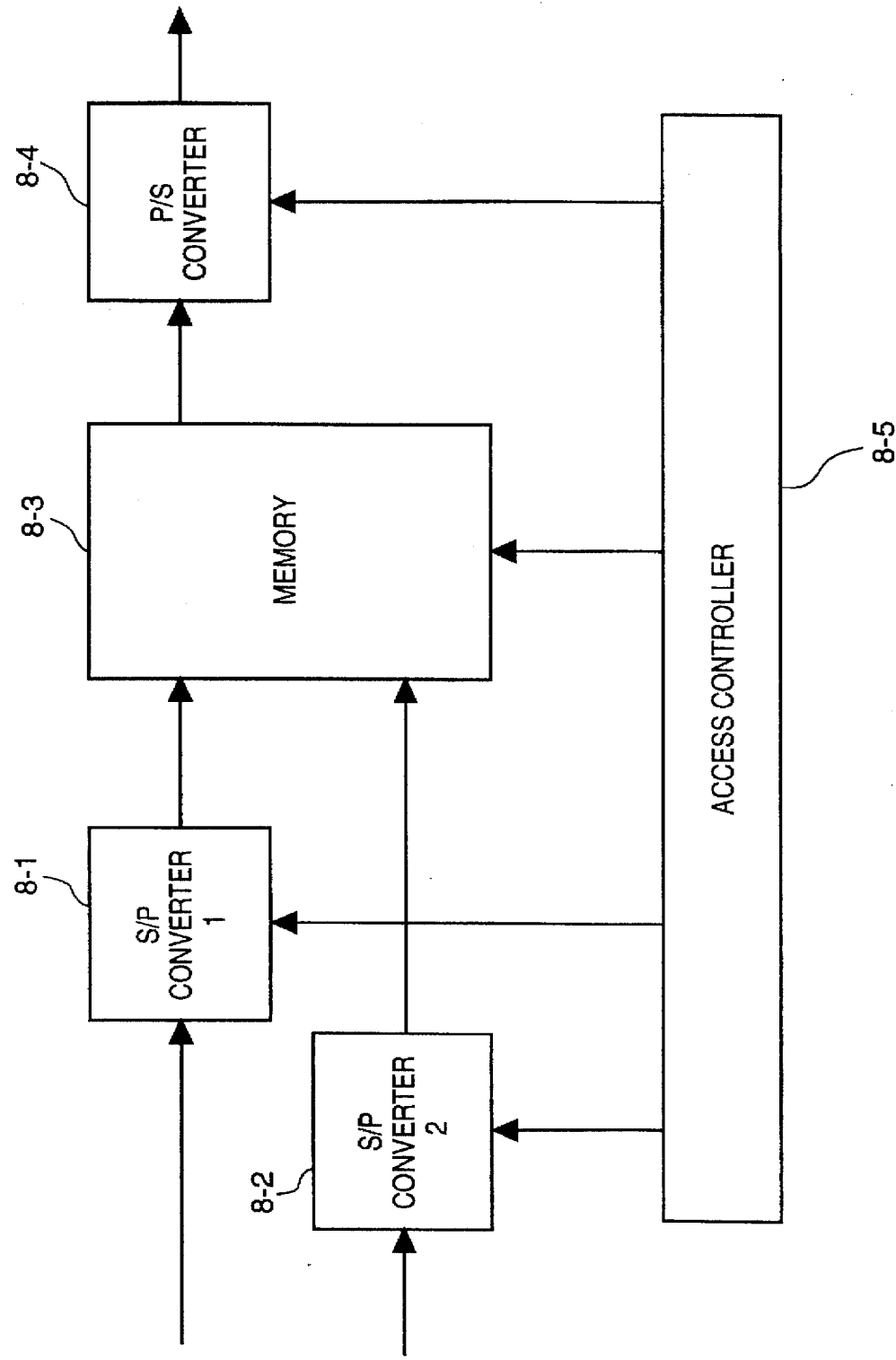
FIG. 8 is a block diagram showing a detailed configuration of the buffer memory 7-1 according to the second embodiment of FIG. 7.

FIG. 8 is a block diagram showing a detailed configuration of the buffer memory 7-1 according to the second embodiment. In FIG. 8, an S/P (serial/parallel) converter 1 (8-1) and an S/P converter 2 (8-2) are composed of shift registers, for example, and the S/P converter 1 performs serial/parallel conversion on the image data outputted from the image binarizing device 1-2, and the S/P converter 2 performs serial/parallel conversion on the image data outputted from the image processing device 1-5. The converted data is stored in a memory 8-3.

The memory 8-3 is composed of SRAM and the like, for example, and it writes and reads data at a designated address. The data read from the memory 8-3 is converted to serial data by a P/S converter 8-4, composed of shift registers and the like, and is then outputted to the encoder 1-6 shown in FIG. 7.

With the aforesaid configuration, an access controller 8-5 controls address settings of the memory and access timing. The access controller 8-5 consists of an address counter and sequential circuit (both are not shown).

By using the above-described buffer memory 7-1, image data outputted from the image binarizing device 1-2 and from the image processing device 1-5 is stored in corresponding areas in the buffer memory 7-1 by one scanning line. In the memory, data is sequentially written in an area corresponding to a plurality of number of lines by managing addresses. As data of a single line is written, data of a single line is sent to the encoder 1-6, and encoding process corresponding to the sent data is performed.

Third Embodiment

A third embodiment of the present invention is described below.

Figure 9:
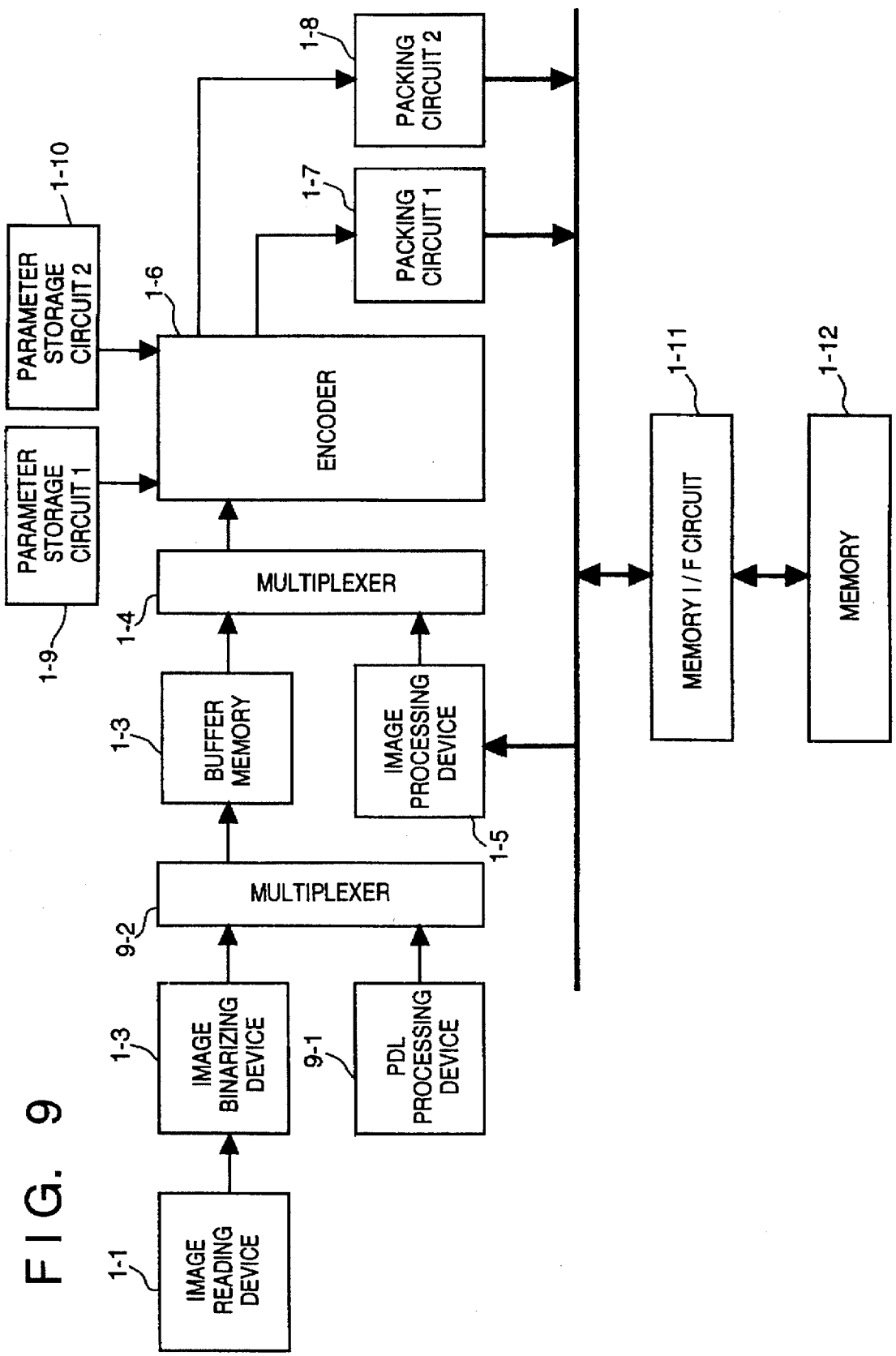
FIG. 9 is a block diagram showing a configuration of an encoding processing apparatus according to a third embodiment.

FIG. 9 is a block diagram showing a configuration of an encoding processing apparatus according to the third embodiment. It should be noted that the same units and elements as those in the first embodiment shown in FIG. 1 are referred by the same reference numerals in the third embodiment, and explanations of those are omitted.

Difference between the configuration shown in FIG. 9 and the configuration shown in FIG. 1 is that a page description language (PDL) processing device 9-1 and a multiplexer 9-2 are added.

The PDL processing device 9-1 is installed in an LBP capable of processing a page description language, for instance, and it consists of a RISC chip, DRAM, centronics interface (sometimes called as "centro") and the like. In the third embodiment, the PDL processing device 9-1 receives document data written in a page description language from a personal computer via the centronics interface, and converts the received data into bitmap data, and then outputs bitmap data.

The PDL processing device 9-1 interchanges data with a controller (not shown), and the multiplexer 9-2 selects either an output from the image binarizing device 1-2 or an output from the PDL processing device 9-1. The multiplexer 9-2 is composed of AND gates, OR gates and the like.

Figure 10:
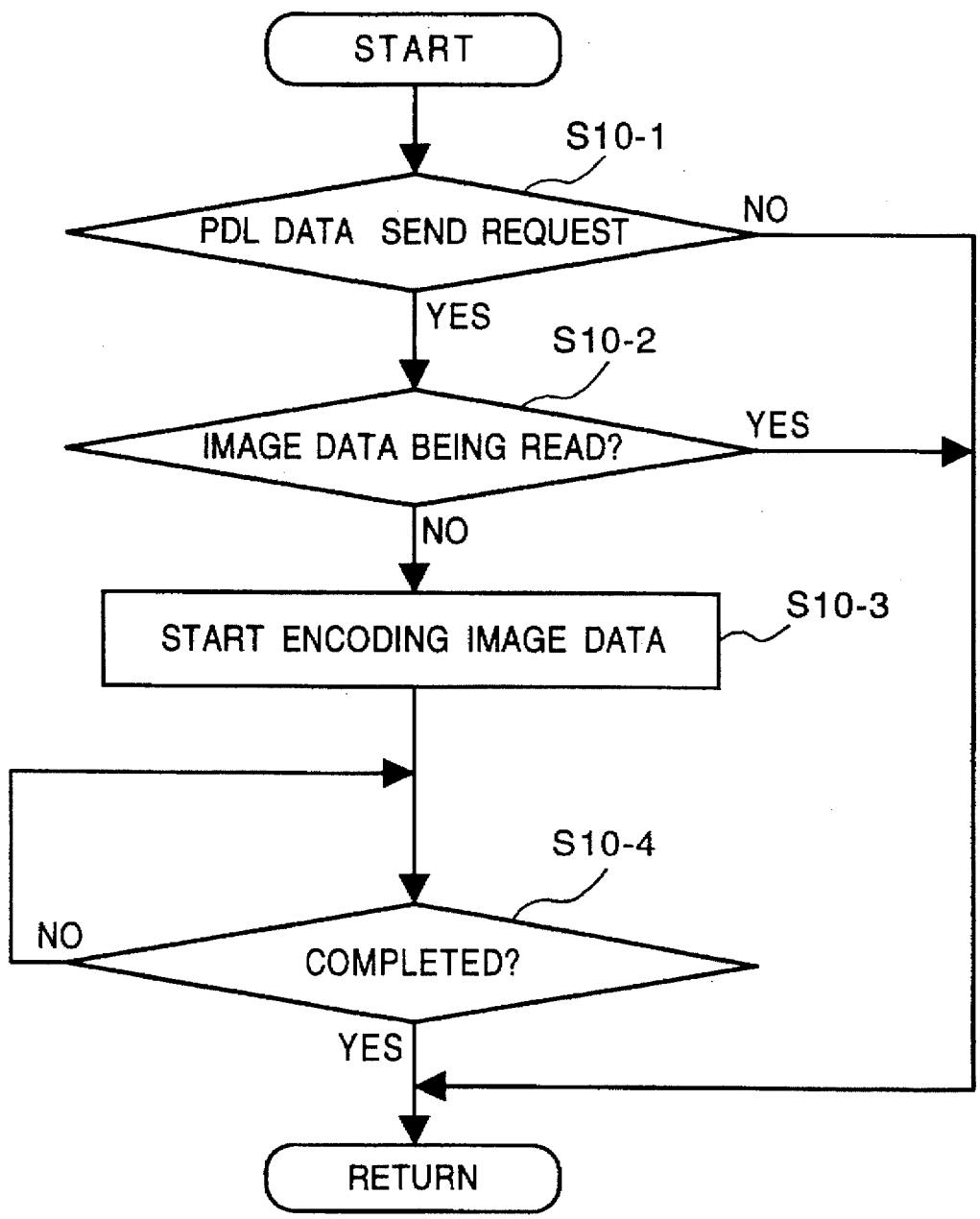
FIG. 10 is a flowchart showing a control operation in the apparatus of the third embodiment.

FIG. 10 is a flowchart showing a control operation of the apparatus in the third embodiment. As shown in FIG. 10, when a send request for PDL data is sent from the PDL processing device 9-1 (YES at step S10-1), whether or not the image data is being read is determined (step S10-2). If it is not, the multiplexer 9-2 selects image data outputted from the PDL processing device 9-1 so that the image data starts being encoded (step S10-3). The encoding process here is the same as the one described in the aforesaid embodiment, thus its explanation is omitted. Then, when the image data has been encoded (YES at step S10-4), this process is completed.

According to the third embodiment as described above, by adding a multiplexer which selectively outputs either an output from a circuit for binarizing read image data or an output from a device for converting a page description language into an image data, it becomes possible to perform a compressive coding on image data outputted from a page description language processing device.

The present invention can be applied to a system constituted by a plurality of devices or to an apparatus comprising a single device.

According to the aforesaid embodiments as described above, it is possible to perform a compressive coding on read image data which is required to be encoded in real time with a simple configuration.

Further, a compressive coding is performed on image data which is converted from a page description language to bitmap data with simple configuration.

Furthermore, the invention is applicable also to a case where the invention is embodied by supplying a program to a system or apparatus. In this case, a storage medium, storing a program according to the invention, constitutes the invention. The system or apparatus installed with the program read from the medium realizes the functions according to the invention.

What is claimed is:

1. An encoding processing apparatus which performs a compressive coding on image data, comprising:

first image generating means for generating first image data in units of a predetermined amount which is less than a page;

second image generating means for generating second image data in units of a predetermined amount which is less than a page;

first switching means for selecting the first or second image data;

first parameter storage means for storing first parameters to be used in coding the first image data;

second parameter storage means for storing second parameters to be used in coding the second image data;

second switching means for selecting the first or second parameters;

encoding means for encoding the image data selected by said first switching means in accordance with the parameters selected by said second switching means and for outputting code image data in units of one scanning line; and control means for controlling switching operations of said first and second switching means so as to cause said encoding means to alternately encode the first or second image data in units of one scanning line.

2. The encoding processing apparatus according to claim 1, wherein said first image generating means includes an image reading device for optically reading a document, an image binarizing device for binarizing the image data read by said image reading device, and a buffer memory for storing the binarized image data and outputting the binarized image data in units of one scanning line.

3. The encoding processing apparatus according to claim 1, wherein said second image generating means includes a memory for storing the second image data.

4. The encoding apparatus according to claim 1, wherein said second image generating means includes page description language processing means for converting data based on a page description language into the second image data.

5. The encoding processing apparatus according to claim 1, wherein said control means causes said encoding means to encode the first image data in response to a first request, and causes said encoding means to encode the second image data in response to a second request.

6. The encoding processing apparatus according to claim 5, wherein, when the first and second requests are simultaneously issued, said control means preferentially accepts the first request.

7. The encoding processing apparatus according to claim 1, wherein said second image generating means includes an image editing means for enlarging/compressing the second image data.

8. The encoding processing apparatus according to claim 1, wherein said first image generating means generates the first image data in units of one scanning line.

9. The encoding apparatus according to claim 1, wherein said second generating means generates the second image data in units of one scanning line.

10. An encoding processing method which performs a compressive coding on image data, comprising the steps of:

a first image generating step of generating first image data in units of a predetermined amount which is less than a page;

a second image generating step of generating second image data in units of a predetermined amount which is less than a page;

a first switching step of selecting the first or second image data;

a first parameter storage step of storing first parameters to be used in coding the first image data;

a second parameter storage step of storing second parameters to be used in coding the second image data;

a second switching step of selecting the first or second parameters;

an encoding step of encoding the image data selected by said first switching step in accordance with the parameters selected by said second switching step and of outputting code image data in units of one scanning line; and a control step of controlling switching operations of said first and second switching step so as to cause said encoding step to alternately encode the first or second image data in units of one scanning line.

11. The encoding processing method according to claim 10, wherein said first image generating step includes an image reading step of optically reading a document, an image binarizing step of binarizing the image data read by said image reading step, and a storing step of storing the binarized image data and outputting the binarized image data in units of one scanning line.

12. The encoding processing method according to claim 10, wherein said second image generating step includes a storing step of storing the second image data in a memory.

13. The encoding processing method according to claim 10, wherein, at said second image generating step, a page description language processing step is employed for converting data based on a page description language into the second image data.

14. The encoding processing method according to claim 10, wherein, at said control step, said encoding step to encode the first image data is caused in response to a first request, and said encoding step to encode the second image data is caused in response to a second request.

15. The encoding processing step according to claim 14, wherein, when the first and second requests are simultaneously issued, at said control step, the first request is preferentially accepted.

16. The encoding processing step according to claim 10, wherein said second image generating step includes an image editing step of enlarging/compressing the second image data.

17. The encoding processing step according to claim 10, wherein, at said first image generating step, the first image data in units of one scanning line is generated.

18. The encoding processing step according to claim 10, wherein, at said second generating step, the second image data in units of one scanning line is generated.

19. An encoding processing apparatus which performs a compressive coding on image data, comprising:

first image generating means for generating first image data in units of a predetermined amount which is less than a page;

second image generating means for generating second image data in units of a predetermined amount which is less than a page;

first switching means for selecting the first or second image data;

first parameter storage means for storing first parameters to be used in coding the first image data;

second parameter storage means for storing second parameters to be used in coding the second image data;

second switching means for selecting the first or second parameters;

encoding means for encoding the image data selected by said first switching means in accordance with the parameters selected by said second switching means and for outputting encoded image data in units of one scanning line;

first packing means for packing the encoded first image data by a predetermined unit;

second packing means for packing the encoded second image data by the predetermined unit;

third switching means for selecting said first or second packing means; and control means for controlling switching operations of said first and second switching means so as to cause said encoding means to alternately encode the first or second image data in units of one scanning line, wherein said control means controls a switching operation of said third switching means.

20. An encoding processing method which performs a compressive coding on image data, comprising the steps of:

a first image generating step of generating first image data in units of a predetermined amount which is less than a page;

a second image generating step of generating second image data in units of a predetermined amount which is less than a page;

a first switching step of selecting the first or second image data;

a first parameter storage step of storing first parameters to be used in coding the first image data;

a second parameter storage step of storing second parameters to be used in coding the second image data;

a second switching step of selecting the first or second parameters;

an encoding step of encoding the image data selected by said first switching step in accordance with the parameters selected by said second switching step and of outputting encoded image data in units of one scanning line;

a first packing step of packing the encoded first image data by a predetermined unit;

a second packing step of packing the encoded second image data by the predetermined unit;

a third switching step of selecting said first or second packing means; and a control step of controlling switching operations of said first and second switching step so as to cause said encoding step to alternately encode the first or second image data in units of one scanning line, wherein, at said control step, a switching operation of said third switching step is controlled.

* * * * *

UNITED STATES PATENT AND TRADEMARK OFFICE
CERTIFICATE OF CORRECTION

PATENT NO. :   5,673,119

DATED        :   September 30, 1997

INVENTOR(S):   YUKIO MURATA

It is certified that error appears in the above-identified patent and that said Letters Patent is hereby corrected as shown below:

COLUMN 1
  Line 60,   "Document" should read --Documents--.

COLUMN 2
  Line 51,   "form" should read --from--.

COLUMN 4

Line 22,   "become" should read --becomes--;
  Line 56,   "on" should read --one--.

COLUMN 6
  Line 38,   "those" should read --of those--.

COLUMN 7
  Line 25,   "as" should read --a--.

Signed and Sealed this

Fifth Day of May, 1998

Attest:

BRUCE LEHMAN

*Attesting Officer*                *Commissioner of Patents and Trademarks*